United States Patent [19]
Hornung

[11] 3,771,617
[45] Nov. 13, 1973

[54] AXLE SUSPENSION IN A BUS

[75] Inventor: Walter Hornung, Stuttgart, Germany

[73] Assignee: Daimler-Benz Aktiengesellschaft, Stuttgart, Germany

[22] Filed: July 27, 1972

[21] Appl. No.: 275,634

[30] Foreign Application Priority Data
July 28, 1971  Germany.................. P 21 37 624.9

[52] U.S. Cl............................ 180/24.02, 280/124 F
[51] Int. Cl... B62d 61/10, B62d 61/12, B60g 11/26
[58] Field of Search.................. 180/24.02, DIG. 2, 180/21; 280/124 F

[56] References Cited
UNITED STATES PATENTS
3,477,738  11/1969  Manning..................... 180/24.02 X FOREIGN PATENTS OR APPLICATIONS
791,530  9/1935  France................................... 180/21
185,457  9/1922  Great Britain........................ 180/21
111,646  8/1944  Sweden............................. 180/24.02

Primary Examiner—Robert S. Ward, Jr.
Attorney—Paul M. Craig, Jr. et al.

[57]  ABSTRACT

An axle arrangement in buses in which an auxiliary axle equipped with a single wheel is provided on the side of the main axle opposite the driving engine whereby the single wheel of the auxiliary axle is disposed between the longitudinal bearers of the substructure, preferably substantially in the vehicle longitudinal center.

31 Claims, 3 Drawing Figures

PATENTED NOV 13 1973

AXLE SUSPENSION IN A BUS

The present invention relates to an axle arrangement in a bus. In various countries, normal two-axle vehicles cannot be used always because the permissive rear axle load as determined by legal rules and requirements is exceeded. In commercial vehicles leading or trailing axles with two wheels are therefore used which support a part of the vehicle weight either continuously or only as required. This solution is unfavorable in a bus for space reasons and results in a high dead-weight as well as in a loss of valuable luggage space.

The aim of the present invention essentially consists in creating a light-weight, space-saving axle arrangement in a bus, by means of which the problems connected with the legally permissible axle load are circumvented. Especially in buses with a heavy rear engine of high power rating and especially with modern vehicle equipment such as rest rooms, wash rooms, etc., there exists the danger that the permissive axle load can no longer be maintained.

The underlying problems are solved according to the present invention in that on the side of a main axle opposite the driving engine, an additional or auxiliary axle equipped with a single wheel is provided and in that the wheel of the auxiliary axle is disposed between the longitudinal bearers of the substructure—preferably in the vehicle longitudinal center.

With a bus having a rear axle load of approximtely 10 t, one utilizes generally a tire size 11.00-20. However, a legal regulations permit sometimes only a maximum axle load of about 8 t. According to the present invention, a single additional wheel, for example, with a tire size 9.00-20 may be provided so that the axle load of originally 10 t is lowered to less than 8 t. The axle arrangement according to the present invention can be moved placing the rear axle close to the rear engine since the additional wheel is disposed on the side of the main axle opposite the engine. The luggage spaces provided laterally of the longitudinal bearers are not reduced by the additional or auxiliary axle owing to the location of the additional wheel between the longitudinal bearers of the substructure.

A spatially favorable accommodation of the additional axle is achieved according to a further feature of the present invention in that the guide members of the main axle are disposed on one side of the main axle and the auxiliary axle on the other side of the main axle.

In order to avoid that the suspensions of the main and of the auxiliary axle operate against one another, according to a further feature of the axle arrangement of the present invention, provision may be made that the points of pivotal connection of main and auxiliary axle are so disposed in relation to their respective axes that the spring movements of both axles about their points of pivotal connection take place in the same direction, i.e., both either clockwise or anti-clockwise.

With a bus having a rear engine, a good space utilization results according to a further feature of the present invention in that the driving engine is disposed to the rear and the auxiliary or additional axle in front of the rear axle.

An embodiment of the axle arrangement according to the present invention which is advantageous by reason of its low structural expenditures is characterized in that the axle carrier of the auxiliary axle, which is spring-supported with respect to the vehicle body, is pivotally connected at the vehicle body and serves for the axle guidance. With this type of construction, the axle carrier of the additional or auxiliary axle serves both for the spring support as also for the guidance of the auxiliary axle.

The axle carrier of the auxiliary axle may be provided with inclined guide members so that the axle is guided in a simple manner by the same guide member in the longitudinal and transverse directions.

In order to include the auxiliary axle into the load-dependent level control system of the main axle, the auxiliary axle can be spring-supported by at least one pressure medium spring which is connected to the pressure medium system of the main axle.

In order to avoid that the pressure medium spring of the auxiliary axle impairs the lifting of the auxiliary axle, this pressure medium spring is adapted to be selectively turned off or disconnected.

Approximately, the auxiliary axle is adjustable into the raised or lowered position by a servo-motor.

In order to avoid with certainty that due to inadvertence or inattention during the lifting of the auxiliary axle the pressure medium spring thereof is damaged by the effect of the servo-force, the arrangement may be made in such a manner according to the present invention that the control device for the operation of the servo-motor and the control device for the disconnection of the pressure medium spring of the auxiliary axle are so coupled with one another that in the position of the control device of the servo-motor for the lifting of the auxiliary axle, the control device of the pressure medium spring is forcibly in its position for the disconnection of the pressure medium spring.

In order to further prevent that the engagement or connection of the pressure medium spring of the auxiliary axle is inadvertently forgotten during the lowering of the auxiliary axle, provision may be made additionally that the control device of the servo-motor and the control device of the pressure medium spring are so coupled with one another that in the position of the control device of the servo-motor for the lowering of the auxiliary axle, the control device of the pressure medium spring is forcibly in its position for the connection of the pressure medium spring of the auxiliary axle with the pressure medium sring system of the main axle.

The servo-motor of the auxiliary axle can be connected as pressure medium motor to the pressure medium system of the spring system of the main axle.

Accordingly, it is an object of the present invention to provide an axle arrangement in buses which avoids by simple means the aforementioned shortcomings and drawbacks encountered in the prior art.

Another object of the present invention resides in an axle arrangement of a bus in which maximum prescribed axle loads can be maintained without loss in valuable luggage space and/or other conveniences.

A further object of the present invention resides in an axle arrangement of a bus in which the problems resulting from maximum prescribed axle loads can be eliminated in a simple and space-saving manner.

A still further object of the present invention resides in an axle arrangement for a bus which reduces the specific load per axle without increasing considerably the weight of the axle arrangement.

Still another object of the present invention resides in an axle arrangement for a bus provided with a rear engine which utilizes a simple, light-weight auxiliary axle suspension so arranged as not to work counter the main axle arrangement.

A still further object of the present invention resides in an axle arrangement of the type described above which automatically prevents damage to the pressure medium spring means of the axle arrangement, particularly of the auxiliary axle due to inadvertence or inattention of the operating personnel.

Another object of the present invention resides in a control system for an axle arrangement consisting of main axle and auxiliary axle adapted to be lowered and retracted, which prevents improper operation, damage to parts of the auxiliary axle and failure to engage the spring system of the auxiliary axle.

These and further objects, features and advantages of the present invention will become more apparent from the following description when taken in connection with the accompanying drawing which shows, for purposes of illustration only, one embodiment in accordance with the present invention, and wherein.

Figure 1:
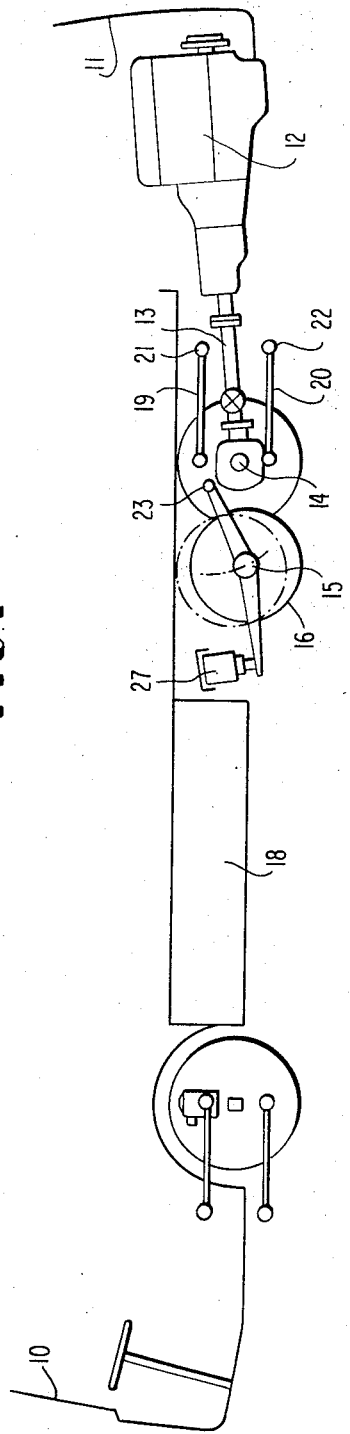
FIG. 1 is a schematic side view of the substructure of a bus with a rear axle arrangement in accordance with the present invention.
Figure 2:
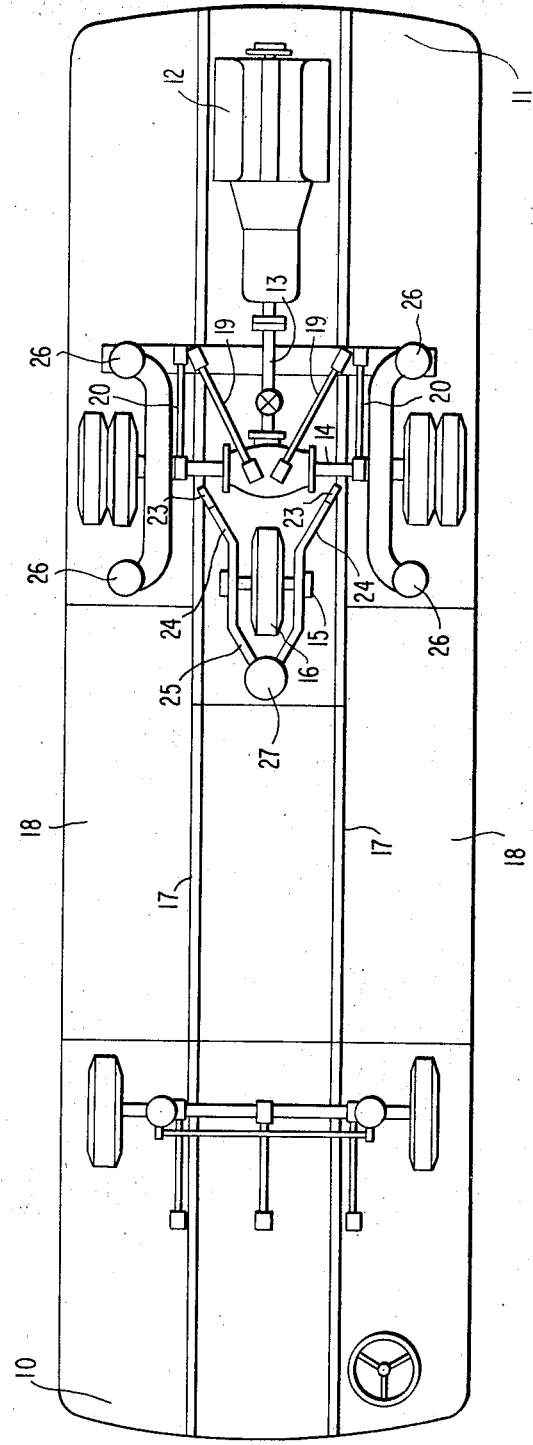
FIG. 2 is a schematic plan view of the substructure of FIG. 1.

Referring now to the drawing wherein like reference numerals are used throughout the various views to designate like parts, the front end of the bus is designated by reference numeral 10 and the rear end thereof by reference numeral 11. The driving engine 12 is arranged in the rear end 11 which drives the rear axle 14 by way of a Cardan shaft 13. On the side of the rear axle 14 opposite the driving engine 12 is provided an additional or auxiliary axle 15 whose single wheel 16 is disposed between the longitudinal bearers 17 of the substructure or sub-frame so that the luggage spaces 18 of the substructure disposed laterally of the longitudinal bearers 17 are not reduced by the auxiliary axle 15. The rear axle 14 is guided by means of two upper inclined guide members 19 and two lower longitudinal guide members 20 which are all disposed on the side of the rear axle 14 opposite the auxiliary axle 15. The points of pivotal connection 21 of the inclined members 19 and the points of pivotal connection 22 of the longitudinal guide members 20 are respectively disposed to the rear of the rear axle 14 at the substructure. Also, the points of pivotal connection 23 of the two inclined guide arms 24 with which the U-shaped axle carrier 25 of the wheel 16 is equipped, are disposed to the rear of the auxiliary axle 15 so that the axles 14 and 15 spring-deflect in the same direction, i.e., both either clockwise or counterclockwise. The rear axle 14 is spring-supported with respect to the substructure by way of four pneumatic spring bellows 26 whereas the axle carrier 25 is spring-supported at the substructure by a pneumatic spring bellows 27.

Figure 3:
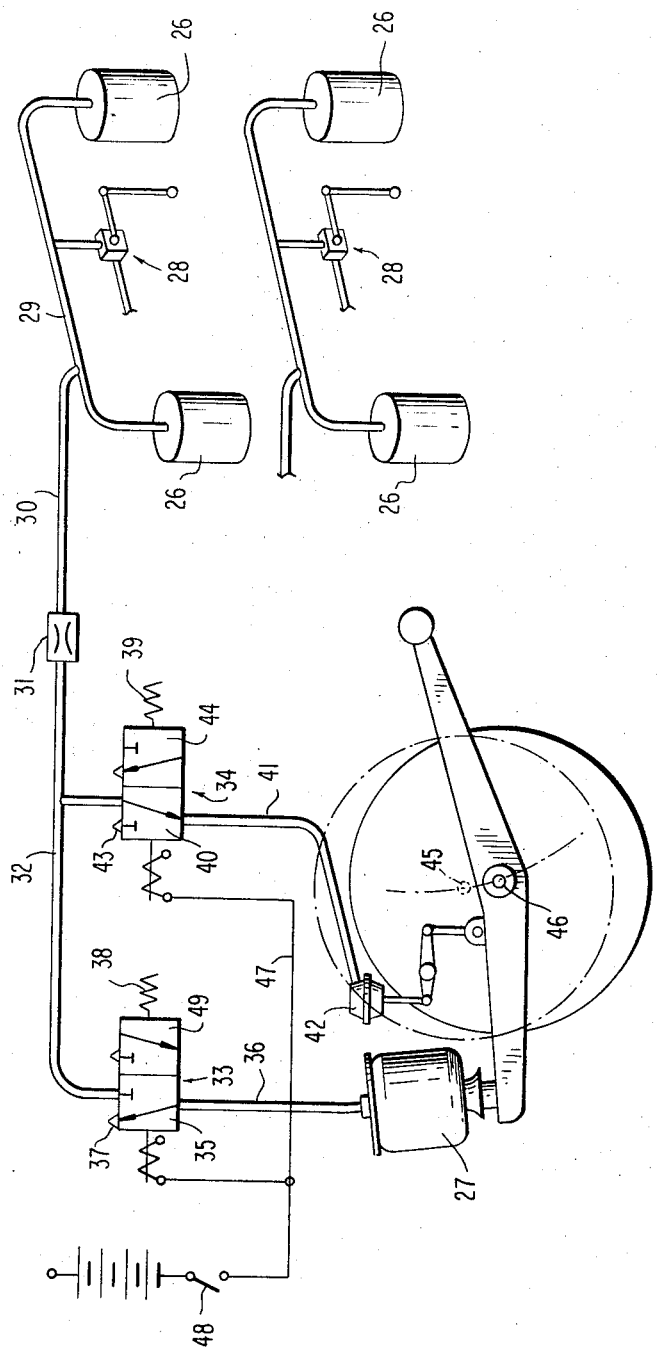
FIG. 3 is a schematic exploded view of the essential parts belonging to the spring support and to the raising and lowering mechanism of the auxiliary axle in the axle arrangement according to the present invention as illustrated in FIGS. 1 and 2.

Two pneumatic spring bellows 26 each of the rear axle (FIG. 3) are so controlled by a level control valve generally designated by reference numeral 28 responding to a level change or change in distance between axle and body that the distance between axle and body remains the same with change in vehicle load.

A compressed-air auxiliary line 30 is connected to working line 29 of two pneumatic spring bellows 26, in which is arranged a pressure-reducing valve 31. Two electromagnetically actuatably three-two-way control valves generally designated by reference numerals 33 and 34 and of conventional construction are connected to the section 32 of the branch line 30 disposed to the rear or downstream of the valve 31. The control valve 33 serves for the disconnection of the pneumatic spring bellows 27 of the auxiliary axle 15 whereby in the normal position 35 of the valve 33 enforced by means of the spring force 38 the working line 36 of the pneumatic spring bellows 27 is vented by way of the vent connection 37 and the auxiliary or branch line 30, 32 is closed off with respect to the line 36. In the other energized position 49 of the control valve 33, the lines 32 and 36 are connected with each other and the vent connection 37 is closed off.

In the normal position 40 of the control valve 34 enforced by a spring force 39, the working line 41 of a compressed-air servo-motor 42 for the lifting or the lowering of the auxiliary axle 15 is connected with the auxiliary or branch line 30, 32 so that the auxiliary axle 15 is raised into its load-free floating position 45. The vent connection 43 of the control valve 34 is closed off in the normal position. In the other energized position 44 of the control valve 34, the operating line 41 is vented so that the auxiliary axle 15 is lowered into the operating position 46.

The energizing coils of the control valves 33 and 34 are connected in a control circuit 47 which can be closed by a manual switch 48. By closing the manual switch 48, the control valve 34 of the servo-motor 42 is brought into its position 44 for the lowering of the auxiliary axle 15 whereas the control valve 33 of the spring bellows 27 is forcibly brought into its position 49 for the connection of the pneumatic spring bellows 27 with the pneumatic spring bellows 26. In contradistinction thereto, the control valve 33 of the pneumatic spring bellows 27 is forcibly brought by the spring force 38 into its position 37 for the disconnection of the spring bellows when by opening the manual switch 48 the control valve 34 of the servo-motor 42 is actuated into its position 40 for the lifting of the auxiliary axle 15.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. An axle arrangement in a bus having longitudinal bearer means, a main axle means and a driving engine disposed on one side of the main axle means, characterized in that on the side of the main axle means opposite the driving engine an auxiliary axle means equipped with a single wheel is provided, and in that the single wheel of the auxiliary axle means is disposed between the longitudinal bearer means of a substructure.

2. An axle arrangement according to claim 1, characterized in that the single wheel of the auxiliary axle means is arranged substantially in the vehicle longitudinal center.

3. An axle arrangement according to claim 2, characterized in that the main axle means is a rear axle.

4. An axle arrangement according to claim 1, characterized in that the main axle means includes guide means disposed on one side of the main axle means while the auxiliary axle means is disposed on the other side of the main axle means.

5. An axle arrangement according to claim 4, characterized by pivotal connecting means for pivotally connecting the main axle and auxiliary axle means at the substructure, the points of pivotal connection of the main and auxiliary axle means being so disposed with respect to their axes that the spring movements of both axle means about their points of pivotal connection take place in the same direction.

6. An axle arrangement according to claim 5, characterized in that the driving engine is disposed to the rear of the main means formed by a rear axle and the auxiliary axle means in front of the main rear axle means.

7. An axle arrangement for a bus with a vehicle body according to claim 6, characterized in that the auxiliary axle means includes an axle carrier means spring-supported with respect to the vehicle body, said axle carrier means being pivotally connected at the vehicle body and serving for the axle guidance.

8. An axle arrangement according to claim 7, characterized in that the axle carrier means of the auxiliary axle means includes inclined guide members.

9. An axle arrangement according to claim 7, characterized in that the auxiliary axle means is spring-supported by at least one pressure medium spring means which is connected to a pressure medium spring system of the main axle means.

10. An axle arrangement according to claim 9, characterized in that the pressure medium spring means of the auxiliary axle means includes a pneumatic spring bellows connected with pneumatic spring bellows of the main axle means.

11. An axle arrangement according to claim 9, characterized by means for selectively disconnecting the pressure medium spring means of the auxiliary axle means.

12. An axle arrangement according to claim 11, characterized in that the auxiliary axle means is adapted to be selectively lowered and raised by a servo-motor from a load-free, floating position into a load-transmitting operating position and vice versa.

13. An axle arrangement according to claim 12, characterized by control means for the operation of the servo-motor and control means for the disconnection of the pressure medium spring means of the auxiliary axle means, and in that said two control means are so connected with each other that in the position of the control means of the servo-motor for lifting the auxiliary axle means the control means of the pressure medium spring means is forcibly in its position for the disconnection of the pressure medium spring means.

14. An axle arrangement according to claim 13, characterized in that the control means of the servo-motor and the control means of the pressure medium spring means are so connected with each other that in the position of the control means of the servo-motor for the lowering of the auxiliary axle means, the control means of the pressure medium spring means is forcibly in its position for the connection of the pressure medium spring means of the auxiliary axle means with the pressure medium spring system of the main axle means.

15. An axle arrangement according to claim 14, characterized in that a working pressure line of the pressure medium servo-motor is adapted to be connected to the pressure medium system of the spring system of the main axle means.

16. An axle arrangement according to claim 15, characterized in that said control means each include a three/two-way valve.

17. An axle arrangement according to claim 16, characterized in that the single wheel of the auxiliary axle means is arranged substantially in the vehicle longitudinal center.

18. An axle arrangement according to claim 17, characterized in that the pressure medium spring means of the auxiliary axle means includes a pneumatic spring bellows connected with pneumatic spring bellows of the main axle means.

19. An axle arrangement according to claim 18, characterized in that the axle carrier means of the auxiliary axle means includes inclined guide members.

20. An axle arrangement according to claim 1, characterized by pivotal connecting means for pivotally connecting the main axle and auxiliary axle means at the substructure, the points of pivotal connection of the main and auxiliary axle means being so disposed with respect to their axes that the spring movements of both axle means about their points of pivotal connection take place in the same direction.

21. An axle arrangement according to claim 1, characterized in that the driving engine is disposed to the rear of the main axle means formed by a rear axle and the auxiliary axle means in front of the main rear axle means.

22. An axle arrangement for a bus with a vehicle body according to claim 1, characterized in that the auxiliary axle means includes an axle carrier means spring-supported with respect to the vehicle body, said axle carrier means being pivotally connected at the vehicle body and serving for the axle guidance.

23. An axle arrangement according to claim 22, characterized in that the axle carrier means of the auxiliary axle means includes inclined guide members.

24. An axle arrangement according to claim 1, characterized in that the auxiliary axle means is spring-supported by at least one pressure medium spring means which is connected to a pressure medium spring system of the main axle means.

25. An axle arrangement according to claim 24, characterized in that the pressure medium spring means of the auxiliary axle means includes a pneumatic spring bellows connected with pneumatic spring bellows of the main axle means.

26. An axle arrangement according to claim 24, characterized by means for selectively disconnecting the pressure medium spring means of the auxiliary axle means.

27. An axle arrangement according to claim 24, characterized in that the auxiliary axle means is adapted to be selectively lowered and raised by a servo-motor from a load-free, floating position into a load-transmitting operating position and vice versa.

28. An axle arrangement according to claim 27, characterized by control means for the operation of the servo-motor and control means for the disconnection of the pressure medium spring means of the auxiliary axle means, and in that said two control means are so connected with each other that in the position of the control means of the servo-motor for lifting the auxiliary axle means the control means of the pressure medium spring means is forcibly in its position for the disconnection of the pressure medium spring means.

29. An axle arrangement according to claim 27, characterized in that the control means of the servo-motor and the control means of the pressure medium spring means are so connected with each other that in the position of the control means of the servo-motor for the lowering of the auxiliary axle means, the control means of the pressure medium spring means is forcibly in its position for the connection of the pressure medium spring means of the auxiliary axle means with the pressure medium spring system of the main axle means.

30. An axle arrangement according to claim 27, characterized in that a working pressure line of the pressure medium servo-motor is adapted to be connected to the pressure medium system of the spring system of the main axle means.

31. An axle arrangement according to claim 29, characterized by control means for the operation of the servo-motor and control means for the disconnection of the pressure medium spring means of the auxiliary axle means, and in that said two control means are so connected with each other that in the position of the control means of the servo-motor for lifting the auxiliary axle means the control means of the pressure medium spring means is forcibly in its position for the disconnection of the pressure medium spring means.

* * * * *